US008406419B2

(12) United States Patent  (10) Patent No.: US 8,406,419 B2
Han  (45) Date of Patent: Mar. 26, 2013

(54) SLIDE HINGE APPARATUS

(75) Inventor: Ki Suk Han, Gyeonggi-do (KR)

(73) Assignee: Diabell Co., Ltd, Gyeonggi-do (KR)

( * ) Notice: Subject to any disclaimer, the term of this patent is extended or adjusted under 35 U.S.C. 154(b) by 188 days.

(21) Appl. No.: 13/121,156

(22) PCT Filed: Oct. 8, 2009

(86) PCT No.: PCT/KR2009/005761
§ 371 (c)(1),
(2), (4) Date: Mar. 25, 2011

(87) PCT Pub. No.: WO2010/041885
PCT Pub. Date: Apr. 15, 2010

(65) Prior Publication Data
US 2011/0167592 A1 Jul. 14, 2011

(30) Foreign Application Priority Data

Oct. 9, 2008 (KR) .................. 10-2008-0099143

(51) Int. Cl.
H04M 1/00 (2006.01)
H04M 9/00 (2006.01)
(52) U.S. Cl. ................. 379/433.12; 455/575.4
(58) Field of Classification Search ............ 379/433.11, 379/433.12; 455/575.4; 361/679.39, 679.27, 361/679.13, 679.56; 16/258, 271, 242, 327, 16/345, 352, 353, 362, 367
See application file for complete search history.

(56) References Cited

U.S. PATENT DOCUMENTS

2005/0113154 A1* 5/2005 Park et al. .................. 455/575.4
2006/0030381 A1* 2/2006 Byun et al. .................. 455/575.4
(Continued)

FOREIGN PATENT DOCUMENTS

KR 10-2007-0031127 A 3/2007
KR 10-2007-0058733 A 6/2007
(Continued)

OTHER PUBLICATIONS

PCT International Search Report and Written Opinion issued in PCT Application No. PCT/KR2009/005761 and mailed on Jun. 22, 2010, with English-language translations.

(Continued)

Primary Examiner — Tuan D Nguyen
(74) Attorney, Agent, or Firm — Ladas & Parry, LLP

(57) ABSTRACT

The present invention relates to a slide hinge apparatus and comprises a base frame wherein a space part is formed; a first slider that forms a space part to overlap with said space part of the base frame, and is furnished at the top of said base frame; a second slider that slides following said first slider; a hinge module that connects said first slider with the second slider so that these support each other elastically; a blocking plate furnished between said base frame and the first slider to move following a guide part and block the space part; and a first arm and a second arm that connect said hinge module with the block plate to rotate according to the motion of the hinge module and cause said block plate to slide. According to the present invention, both the slider and the block plate are effectively caused to slide simultaneously using the hinge module and a plurality of arms, thereby closing off the bottom of a liquid crystal screen (FPC) that is opened during sliding.

7 Claims, 3 Drawing Sheets

U.S. PATENT DOCUMENTS

2006/0160584 A1* 7/2006 Lee et al. .................... 455/575.4
2008/0158832 A1* 7/2008 Park et al. ..................... 361/727

FOREIGN PATENT DOCUMENTS

KR  10-2008-0025258 A  3/2008
KR      10-0855945 B1  9/2008

OTHER PUBLICATIONS

PCT International Preliminary Report on Patentability issued in PCT/KR2009/005761 mailed on Apr. 12, 2011, with its English-language translation.

* cited by examiner

SLIDE HINGE APPARATUS

CROSS-REFERENCE TO RELATED APPLICATIONS

This application is the U.S. National Stage of International Patent Application No. PCT/KR2009/005761 filed on Oct. 8, 2009, which claims priority to Korean Patent Application Number 10-2008-0099143 filed on Oct. 9, 2008, the disclosures of which are hereby incorporated by reference in their entirety.

TECHNICAL FIELD

Embodiments of the present invention relate to a slide hinge apparatus, and more particularly to a slide hinge apparatus that causes a slider and a blocking plate to simultaneously slide using a hinge module and a plurality of arms, thereby closing off the bottom of a liquid crystal screen (FPC) that is opened during sliding.

BACKGROUND ART

With increasing popularization of portable wireless terminals all over the world, terminals having various functions and designs to satisfy consumer taste have been placed on the market. Various kinds of portable terminals, including bar type terminals, flip type terminals and flip-up type terminals, have been developed. In recent years, folder type terminals and slide type terminals have been developed and widely used. For slide type terminals, a slide body slides on a main body by a predetermined distance in the longitudinal direction of the terminal, thereby achieving the opening operation of the slide type terminal. A user may push and pull the slide body, thereby achieving more convenient use of the slide type terminal. Consequently, the size of the slide type terminal may be reduced while providing a display screen having a size similar to that of the folder type terminal, and therefore, the slide type terminal is preferred as a high-quality product. Slide type terminals adopt an automatic sliding structure in which, when the slide body is pushed a predetermined distance, the slide body automatically moves the remaining distance. Various kinds of hinge apparatuses have been developed to provide such an automatic sliding structure.

For general slide type terminals, when a liquid crystal screen is slid with respect to a keypad, the bottom of the liquid crystal screen is exposed. As a result, a flexible printed circuit (FPC) is exposed from the bottom of the liquid crystal screen, which detracts from the aesthetics of the terminal. Also, the exposed FPC may be damaged by external causes (foreign matter, impact, users, etc.).

DISCLOSURE

Technical Problem

Therefore, embodiments of the present invention have been made in view of the above problems, and it is an aspect of the present invention to provide a slide hinge apparatus that causes a slider and a blocking plate to simultaneously slide using a hinge module and a plurality of arms, thereby closing off the bottom of a liquid crystal screen (FPC) that is opened during sliding.

It is another aspect of the present invention to provide a slide hinge apparatus for mobile terminals that prevents damage to the FPC mounted in a mobile terminal by the provision of a blocking plate.

Technical Solution

In accordance with an aspect of the present invention, a slide hinge apparatus includes a base frame having a space part formed therein, a first slider having a space part formed to overlap with the space part of the base frame, the first slider being provided at the top of the base frame, a second slider to slide along the first slider, a hinge module to connect the first slider and the second slider to each other so that the first slider and the second slider elastically support each other, a blocking plate provided between the base frame and the first slider to move along a guide part and to block the space parts, and a first arm and a second arm to connect the hinge module and the block plate to each other so that the first arm and the second arm rotate according to motion of the hinge module and cause the block plate to slide.

The hinge module may include a first push rod and a second push rod elastically supported by springs so that the distance between the first push rod and the second push rod varies, the first push rod or the second push rod having a coupling hole through which the first push rod or the second push rod is connected to the first arm or the second arm, and the second arm may be configured so that opposite ends of the second arm are rotated about a reference pin with different radii of rotation.

The first arm and the second arm may be rotated while being guided by guide rods formed at the base frame, and one end of the second arm may slide at the blocking plate to cause the blocking plate to slide.

The first slider may be provided at opposite longitudinal ends thereof with stoppers to restrict the movement of the second slider.

The second slider and the blocking plate may simultaneously slide.

Advantageous Effects

Embodiments of the present invention have an effect of causing a slider and a blocking plate to simultaneously slide using a hinge module and a plurality of arms, thereby closing off the bottom of a liquid crystal screen (FPC) that is opened during sliding.

Also, embodiments of the present invention have an effect of preventing damage to the FPC mounted in a mobile terminal by the provision of a blocking plate.

BEST MODE

In accordance with an aspect of the present invention, a slide hinge apparatus includes a base frame having a space part formed therein, a first slider having a space part formed to overlap with the space part of the base frame, the first slider being provided at the top of the base frame, a second slider to slide along the first slider, a hinge module to connect the first slider and the second slider to each other so that the first slider and the second slider elastically support each other, a blocking plate provided between the base frame and the first slider to move along a guide part and to block the space parts, and a first arm and a second arm to connect the hinge module and the block plate to each other so that the first arm and the second arm rotate according to motion of the hinge module and cause the block plate to slide.

The hinge module may include a first push rod and a second push rod elastically supported by springs so that the distance between the first push rod and the second push rod varies, the first push rod or the second push rod having a coupling hole through which the first push rod or the second push rod is connected to the first arm or the second arm, and the second arm may be configured so that opposite ends of the second arm are rotated about a reference pin with different radii of rotation.

The first arm and the second arm may be rotated while being guided by guide rods formed at the base frame, and one end of the second arm may slide at the blocking plate to cause the blocking plate to slide.

The first slider may be provided at opposite longitudinal ends thereof with stoppers to restrict the movement of the second slider.

The second slider and the blocking plate may simultaneously slide.

Hereinafter, a first exemplary embodiment of the present invention will be described with reference to the accompanying drawings.

Figure 1:
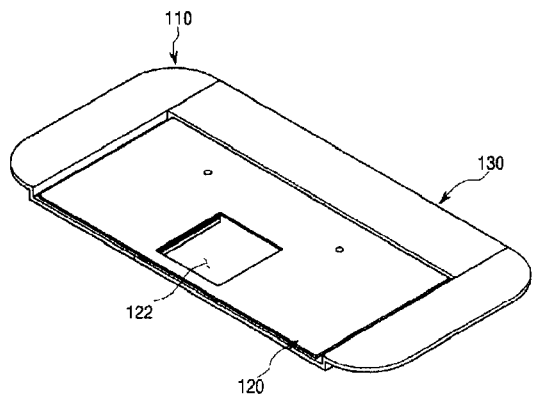
FIG. 1 is a perspective view illustrating a slide hinge apparatus according to an embodiment of the present invention.
Figure 2:
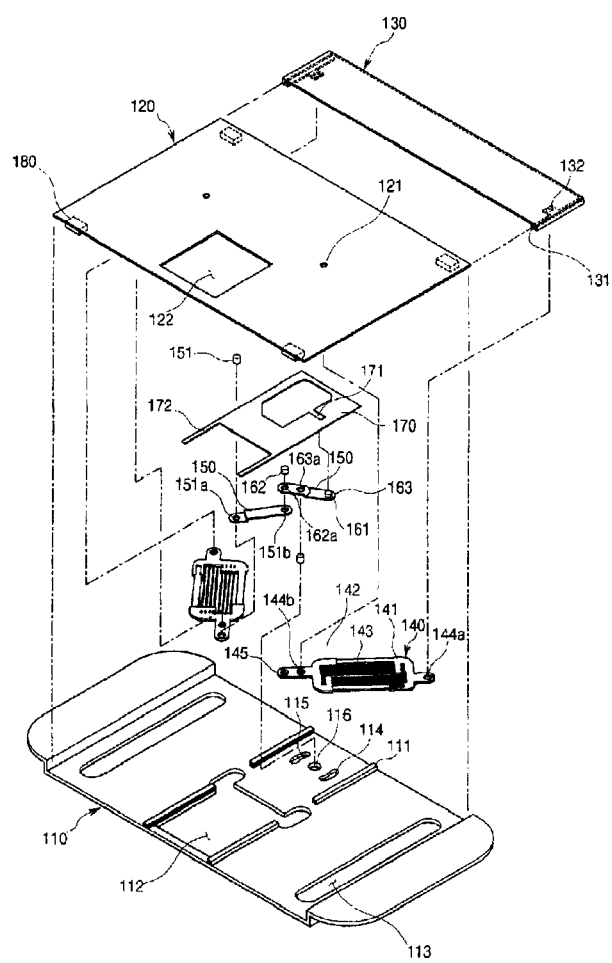
FIG. 2 is an exploded perspective view of the slide hinge apparatus shown in FIG. 1.

Referring to FIGS. 1 and 2, a slide hinge apparatus includes a base frame 110, a first slider 120, a second slider 130, hinge modules 140, a first arm 150, a second arm 160 and a blocking plate 170.

The base frame 110 is formed so that opposite ends of the base frame 110 are stepped from the middle of the base frame 110. A space part 112 is formed at one side of the middle of the base frame 110. Guide parts 111, configured in a '[' shape, are formed along opposite sides of the space part so that the guide parts 111 face each other. A through hole 116 is formed at one side of the space part. Also, semicircular guide rods 114 and 115 having different radii are formed so that the semicircular guide rods 114 and 115 are opposite to each other about the through hole 116. Slide guide holes 113 are formed at opposite sides of the guide parts 111 so that the slide guide holes 113 extend in parallel to the guide parts.

The first slider 120 is provided at one side thereof with an open space part 122. Opposite lateral ends of the first slider 120 are sized to be located at the stepped inside of the base frame. The first slider 120 is provided at the middle thereof with a pair of through holes 121. Also, the space part 122 is opened so as to have a size equal to that of the space part of the base frame. Stoppers 180 are also provided at the edge of the first slider 120.

Opposite lateral ends of the second slider 130 are bent downward in a '[' shape so as to provide guide grooves 131. Horizontally extending coupling pieces 132 are formed at the lower sides of the ends of the second slider. Through holes (not shown) are formed at the respective coupling pieces.

Each of the hinge modules 140 includes a first push rod 141, a second push rod 142 and springs 143. The first push rod and the second push rod are provided with a plurality of guide pins (not shown) protruding in the direction in which the guide pins of the first push rod and the guide pins of the second push rod face each other. Catching pins protruding so as to be adjacent to the guide pins (not shown) in the horizontal direction are provided at the first push rod and the second push rod so that the catching pins are opposite to each other. The springs 143 are fitted on the guide pins to elastically support the first push rod and the second push rod. The first push rod 141 and the second push rod 142 have respective through holes 144a and 144b. Also, a coupling hole 145 is formed at the first push rod 141 or the second push rod 142 so that the coupling hole 145 is adjacent to a corresponding one of the through holes.

The first arm 150 is provided at opposite ends thereof with coupling holes 151a and 151b. The second arm 160 is provided at one end thereof with a coupling hole 162a. The second arm 160 is provided at the other end thereof with a guide protrusion 161. A reference hole 163a is formed between the coupling hole 162a and the guide protrusion 161. Here, the reference hole 163a is formed so as to be closer to the coupling hole 162a.

The middle of the blocking plate 170 is opened, and one side of the opening is cut off to form a guide hole 171. Extension pieces 172 protrude from the edge of one end (in the drawing, the left lower side) of the blocking plate.

The components of the slide hinge apparatus are coupled as follows. First, the second arm 160 is placed on the top of the base frame 110, and a reference pin 163 is inserted through the reference hole 163a of the second arm 160 so that the reference pin is coupled into the through hole 116. Subsequently, the coupling hole 151b of the first arm 150 is located below the coupling hole 162a of the second arm 160, and a coupling pin 162 is inserted through the coupling hole 151b and the coupling hole 162a so that the first arm and the second arm are rotatably coupled to each other.

Subsequently, the hinge modules 140, each including the first push rod, the second push rod and the springs, are located at the first arm side and the second arm side, respectively, the coupling hole 145 of one of the hinge modules is located at the coupling hole 151a of the first arm 150, and a coupling pin 151 is inserted through the coupling hole 145 and the coupling hole 151a so that the hinge module and the first arm are rotatably coupled to each other. Subsequently, the blocking plate 170 is located above the first arm and the second arm, the guide protrusion 161 of the second arm is inserted through the guide hole 171 of the blocking plate, and the blocking plate is inserted into the guide parts 111.

Subsequently, the opposite lateral ends of the first slider 120 are inserted into the guide grooves 131 of the second slider 130 so that the coupling pieces 132 formed at the bottom of the second slider 130 are located at the bottom of the first slider 120, and the first slider and the second slider are located above the blocking plate.

Subsequently, pin are inserted through the through holes 144b of the hinge modules 140 and the through holes 121 of the first slider 120 in a state in which the through holes 144b and the through holes 121 are aligned with each other, the coupling pieces 132 of the second slider 130 are coupled into the through holes 144a of the hinge modules so that the first slider and the second slider are connected by the hinge modules 140 in an elastically supported state.

Figure 3:
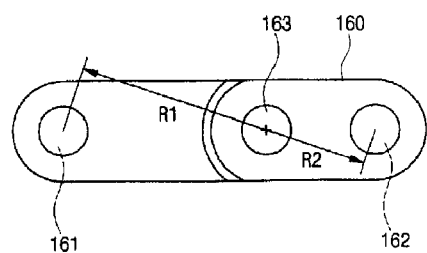
FIG. 3 is a plan view illustrating the state of a first arm and a second arm shown in FIG. 2

As shown in FIG. 3, the second arm 160 has different radii of rotation in which the distance R2 between the reference pin 163 and the coupling pin 162 is different from the distance R1 between the reference pin 163 and the guide protrusion 161. During the rotation of the second arm about the reference pin, therefore, the blocking plate connected to the guide protrusion side is driven in a crank type manner using the difference from the radius of rotation of the first arm connected to the coupling pin side.

That is, when the second slider moves along the first slider, the hinge modules connected to the second slider and the first slider also move. Here, the hinge module at the first slider side which serves as a reference during the movement of the hinge modules extends. In this state, the first arm and the second arm are connected to the hinge modules. The rotation of the reference pin of the second arm connected to the blocking plate is changed so that the blocking plate slides only by the sliding motion of the second slider.

Hereinafter, the operation of the slide hinge apparatus according to the embodiment of the present invention will be described with reference to the accompanying drawings.

Figure 4:
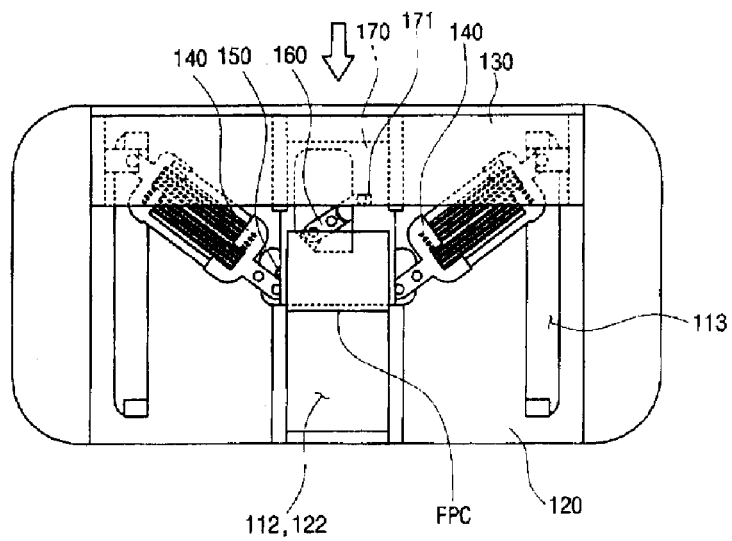
FIG. 4 is an operation view illustrating a closed state of the slide hinge apparatus according to the embodiment of the present invention.
Figure 5:
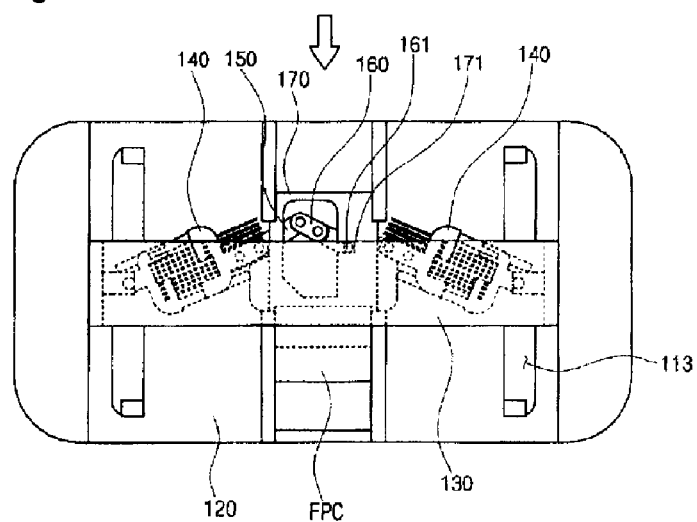
FIGS. 5 and 6 are operation views illustrating operations of the first arm and the second arm according to the embodiment of the present invention.
Figure 6:
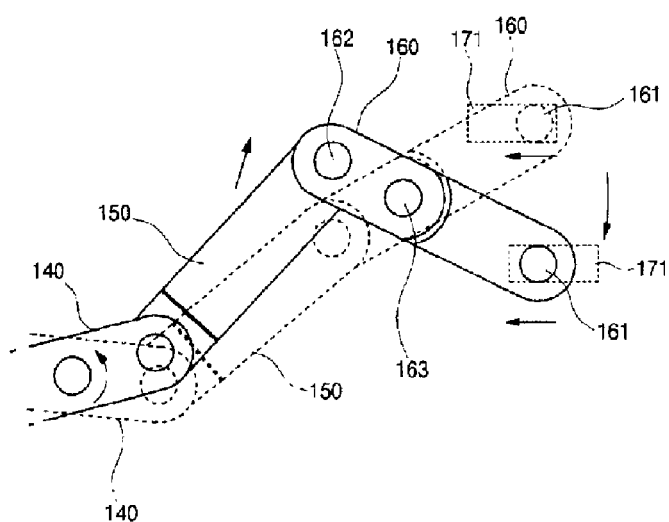

Referring to FIG. 4, a flexible printed circuit (FPC) is disposed in the space parts 112 and 122. One side of the FPC is connected to a key button part (not shown) provided at the base frame, and the other side of the FPC is connected to a liquid crystal screen (not shown) coupled to the second slider, so that data are exchanged via the FPC. When the second slider 130 is pushed downward in a state in which the second slider 130 is located at the top of the base frame (in the drawing) as shown in FIG. 5, the second slider moves along the first slider while the hinge modules connecting the first slider and the second slider are pushed. At this time, as shown in FIG. 6, the end of a corresponding one of the hinge modules is rotated in the direction indicated by an arrow in a state in which the first arm 150 is connected to the end of the corresponding one of the hinge modules with the result that the first arm 150 moves upward, and therefore, the end of the second arm 160 connected to the first arm is pushed. Consequently, the second arm is rotated about the reference pin 163 in a clockwise direction. At the same time, the guide protrusion 11, disposed in the guide hole 171, pushes the guide hole 171 with the result that the blocking plate 170 moves in the sliding direction of the second slider, and the FPC also moves in the space parts.

Figure 7:
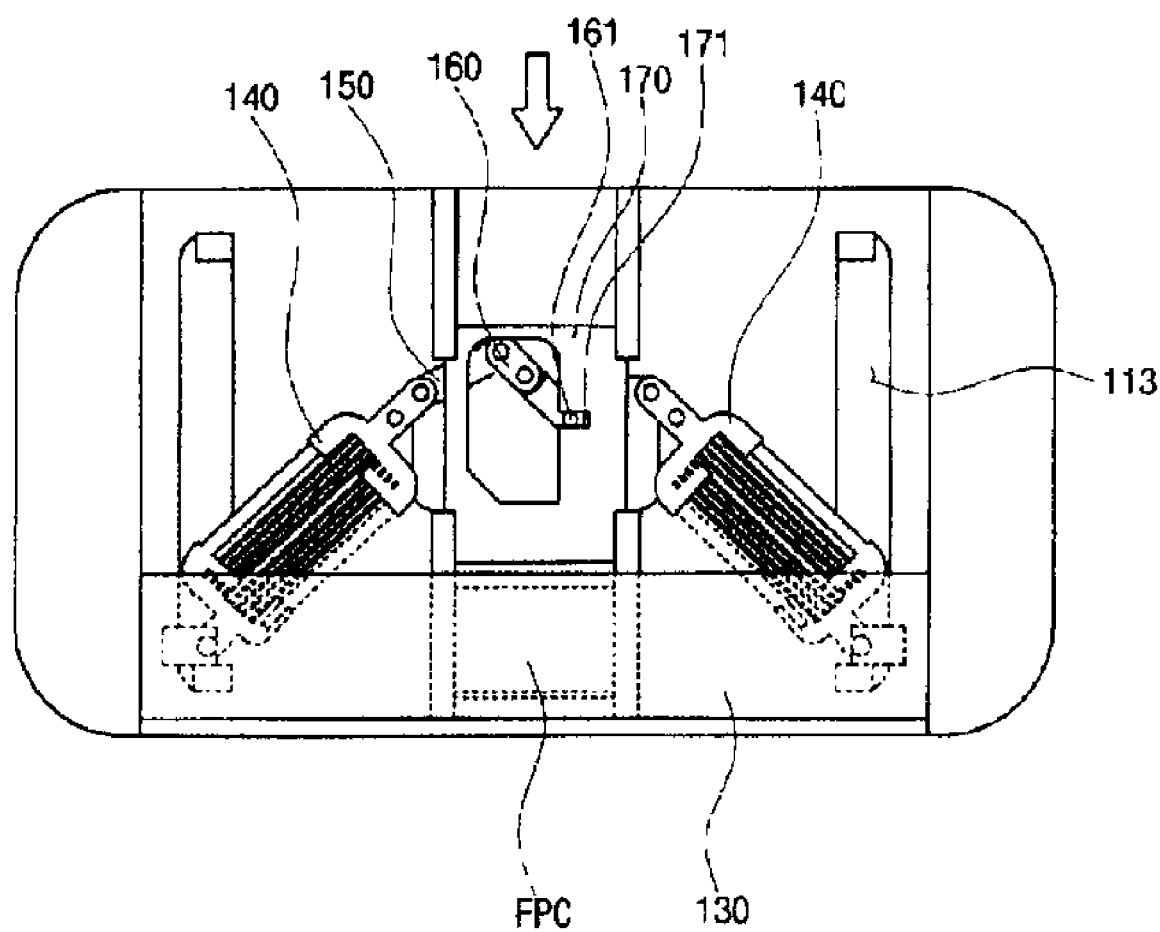
FIG. 7 is an operation view illustrating an open state of the slide hinge apparatus according to the embodiment of the present invention.

When the second slider 130 fully moves to the lower end of the first slider 120 as shown in FIG. 7, the first arm and the second arm are at right angles to each other with the result that the blocking plate blocks the space parts. In this state, although not shown in the drawing, the liquid crystal screen slides open from the key button part. When the second slider moves in the opposite direction, the blocking plate, which is blocking the space parts, is pushed in the sliding direction of the second slider by the first arm and the second arm with the result that the space parts are opened. Consequently, the FPC and the liquid crystal screen may be simultaneously opened and closed by a single sliding motion.

Meanwhile, as previously described, the stoppers are provided at the bottom edge of the first slider to restrict the movement of the second slider and absorb impact during the movement of the second slider.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A slide hinge apparatus comprising:
a base frame having a space part formed therein;
a first slider having a space part formed to overlap with the space part of the base frame, the first slider being provided at a top of the base frame;
a second slider to slide along the first slider;
a hinge module to connect the first slider and the second slider to each other so that the first slider and the second slider elastically support each other;
a blocking plate provided between the base frame and the first slider to move along a guide part and to block the space parts; and
a first arm and a second arm to connect the hinge module and the block plate to each other so that the first arm and the second arm rotate according to motion of the hinge module and cause the block plate to slide.

2. The slide hinge apparatus according to claim 1, wherein the hinge module comprises a first push rod and a second push rod elastically supported by springs so that a distance between the first push rod and the second push rod varies, the first push rod or the second push rod having a coupling hole through which the first push rod or the second push rod is connected to the first arm or the second arm.

3. The slide hinge apparatus according to claim 2, wherein the second arm is configured so that opposite ends of the second arm are rotated about a reference pin with different radii of rotation.

4. The slide hinge apparatus according to claim 2, wherein the first arm and the second arm are rotated while being guided by guide rods formed at the base frame.

5. The slide hinge apparatus according to claim 4, wherein one end of the second arm slides at the blocking plate to cause the blocking plate to slide.

6. The slide hinge apparatus according to claim 1, wherein the first slider is provided at opposite longitudinal ends thereof with stoppers to restrict movement of the second slider.

7. The slide hinge apparatus according to claim 1, wherein the second slider and the blocking plate simultaneously slide.

* * * * *